Jan. 14, 1958

J. J. P. VALETON ET AL 2,820,110

CIRCUIT-ARRANGEMENT FOR CONTROLLING
THE GRADATION OF PICTURE SIGNALS

Filed April 30, 1953

INVENTORS
JOSUE JEAN PHILIPPE VALETON
FRANCISCUS HENRICUS JOZEF VAN DER POEL
BY

AGENT

United States Patent Office 2,820,110

Patented Jan. 14, 1958

2,820,110

CIRCUIT-ARRANGEMENT FOR CONTROLLING THE GRADATION OF PICTURE SIGNALS

Josue Jean Philippe Valeton and Franciscus Henricus Jozef Van Der Poel, Eindhoven, Netherlands, assignors, by mesne assignments, to North American Philips Company, Inc., New York, N. Y., a corporation of Delaware

Application April 30, 1953, Serial No. 352,174

Claims priority, application Netherlands May 7, 1952

5 Claims. (Cl. 179—171)

Figure 1:
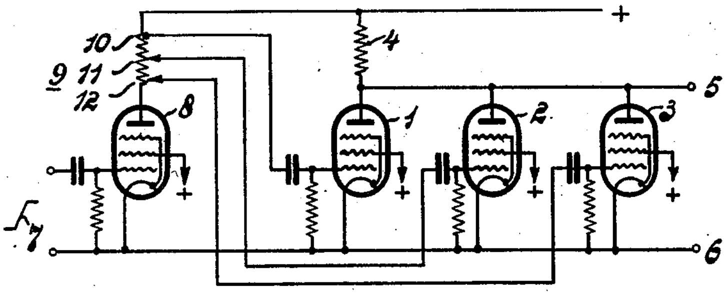

This invention relates to circuit-arrangements for controlling the gradation of a picture signal supplied to the control grids of at least two amplifying tubes having a common output impedance, the signal potential corresponding to black at each control grid having a fixed value, and in which one of the amplifying tubes amplifies the whole signal and the other tube amplifies only part of the signal.

Such circuit-arrangements are, for example, used in television transmitters employing for film scanning the light spot travelling over the picture screen of a cathode-ray tube, which spot is produced by a periodically deflected electron beam.

In this method of film scanning, the quantity of light from the light spot and passed by the film depends linearly upon the gradation of the film picture, and thus the signal in the output circuit of a photocell collecting the said transmitted light also depends linearly upon the gradation of the film picture.

If said signal were supplied without compensation to a television picture tube, the picture displayed on the reproduction screen of the picture tube would have a gradation different from that of the film picture. This is to be ascribed to the fact that an increase in amplitude of the control voltage V of the picture tube involves a brightness increase in accordance with $V\gamma$ of the picture produced on the screen, the exponent $\gamma$ approximately being 2.5 to 3.

In order to secure linear reproduction having the same gradation as that of the film picture, the linear signal obtained on scanning should be changed into a signal whose exponent $\gamma$ is approximately 0.4 to 0.3.

A known circuit-arrangement of this type comprises a number of parallel-connected amplifying tubes having a common anode resistor. The control grids of said tubes are interconnected hence the input signal is the same for all the tubes.

However, the control grid voltage operating range of the tubes is adapted to be varied by altering the screen grid voltage of the tubes. Thus, for example, the tube having the largest control grid voltage operating range amplifies the whole signal from black to white.

A second tube having a smaller control grid voltage operating range amplifies the black parts of the signal, it is true, but not the white part of the signal.

In this manner the desired value of the exponent is controllable.

However, this circuit-arrangement suffers from the disadvantage that, unless taking special steps, variations of the screen grid voltages of the tubes involve variation of the amplitude of the ultimate signal.

The present invention has for its object to provide a circuit-arrangement mitigating said limitation.

The circuit-arrangement according to the invention is characterised in that graduation control is effected by controlling the amplitude of the signal supplied to the control grid of a tube amplifying only part of the signal.

In this circuit-arrangement, consequently, each control grid is not supplied with the same signal amplitude, but these amplitudes are varied for securing correct gradation, without altering the control grid voltage operating ranges of the tubes.

In order that the invention may be readily carried into effect, it will now be described with reference to the accompanying drawing representing examples thereof and in which Fig. 1 shows one form of the circuit-arrangement in accordance with the invention, which will be described with reference to the characteristic curves shown in Figs. 2*a*, 2*b* and 2*c*.

Figure 3:
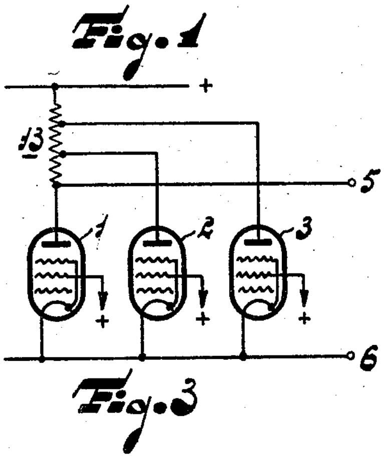
Figure 4:
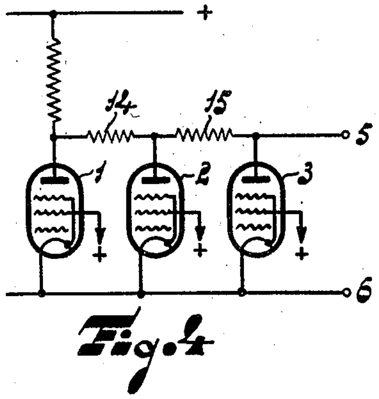

Fig. 3 shows a modified portion of the circuit-arrangement depicted in Fig. 1, and Fig. 4 shows a further modification of the same portion of the circuit-arrangement depicted in Fig. 1.

The circuit-arrangement shown in Fig. 1 comprises three amplifying tubes 1, 2 and 3 constructed as screen-grid tubes having a common anode impedance 4 and output terminals 5 and 6.

The control grid circuits of the tubes 1, 2 and 3 each comprise the usual grid capacitor and grid-leak resistor which are so proportioned that a signal supplied to the control grid is peak-detected to the effect that the maximum potential of the control grids substantially corresponds to the cathode potential of the tubes.

The television signal 7, whose gradation is to be controlled, is supplied in the usual manner to the control grid of an amplifying tube 8 with a polarity such that the potential of the control grid increases with an increase in brightness of the signal. The anode circuit of tube 8 comprises a resistor 9 having a fixed tapping 10 and two variable tappings 11 and 12.

The input signal of tube 1 is taken from point 10 which is so chosen that the amplitude of the signal at the control grid of tube 1 exactly corresponds with the control grid voltage operating range of the tube.

Figure 2:
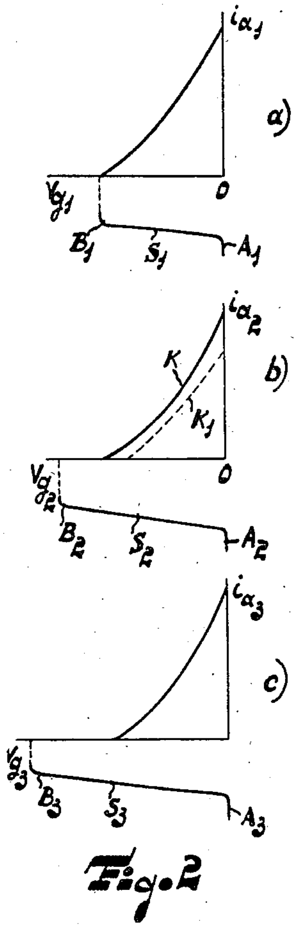

This is illustrated in Fig. 2*a*, in which the anode current $i_{a1}$ of tube 1 is plotted as a function of the grid voltage $V_{g1}$.

The signal $S_1$ supplied to the control grid of tube 1 is indicated along the $V_{g1}$-axis. The potential, corresponding to black, of said signal is indicated at $A_1$ and substantially coincides with a grid voltage $V_{g1}=0$, whereas the potential $B_1$, corresponding to white, of the signal $S_1$ is just situated at the cut-off point of the anode current-grid voltage characteristic curve. Hence, the tube 1 amplifies the whole signal.

A signal of larger amplitude is supplied by way of the tapping 11 to the control grid of the tube 2. This is shown in Fig. 2*b*, in which the black level $A_2$ of the signal $S_2$, whose amplitude exceeds that of $S_1$, again corresponds to cathode potential, but the white level $B_2$ is situated beyond the cut-off point of the characteristic curve of tube 2. Consequently, the tube 2 intensifies only part of the television signal.

Similarly, a signal of still larger amplitude $S_3$ is supplied, by means of a tapping 12, to the control grid of the tube 3, as shown in a similar manner in Fig. 2*c*. On the occurrence of the black level, a given anode current flows in each of the three tubes 1, 2 and 3, which current does not depend upon the value of the amplitudes $S_1$, $S_2$ and $S_3$, since the black level invariably maintains the same grid control voltage for any of the tubes.

On the occurrence of white in the signal, only the tube 1 is conductive so that in this instance also a given anode current passes through the resistor 4, which current does not depend upon the amplitude of the signals $S_2$ and $S_3$.

Consequently, if the amplitudes of the signals $S_2$ and $S_3$ are altered the maximum amplitude of the signal taken from the terminals 5 and 6 does not alter and only the gradation is controlled.

For the sake of clarity it is pointed out that in the aforesaid known circuit-arrangement the amplitudes of the signals $S_1$, $S_2$ and $S_3$ are not altered, but the control grid voltage operating range of tube 2 is reduced for example by means of a variation of the screen grid voltage of tube 2, which means, for example in Fig. 2*b*, that the characteristic curve K shifts to the characteristic curve $K_1$ shown in broken lines. In this instance, however, not only does the control grid voltage operating range of tube 2 alter, but also the amplitude of the current on the occurrence of the black level, i. e. at the cathode potential $V_{g2}=0$, so that this gradation control moreover involves an amplitude variation, which is not the case in the circuit-arrangements in accordance with the invention.

The tubes 1, 2 and 3 in the circuit-arrangement shown in Fig. 1 have only one common anode impedance 4. However, this is not imperative. As shown in Fig. 3, the anodes of tubes 2 and 3 may alternatively be connected to tappings of the anode impedance 13 of tube 1, which permits a closer approximation to the exponential variation of the output voltage.

The tubes 1, 2 and 3 shown in Fig. 3 are controlled similarly to Fig. 1.

As an alternative, the tubes 2 and 3 may be given a larger anode resistor than the tube 1 by connecting, as shown in Fig. 4, series-resistors 14 and 15 between the anodes of the tubes.

To be complete it is pointed out that the tubes 1, 2 and 3 need not necessarily have the same anode current/grid voltage characteristic curves, hence different curves may be used by employing different types of tubes or by giving, for example, each of the three tubes different screen grid voltages. However, said voltages are not changed during gradation control.

What is claimed is:

1. An amplifier for controlling the gradation of a television video signal having a black-representative amplitude and a white-representative amplitude, comprising a first amplifier tube having a control grid and an output electrode and having an operating range, a source of fixed potential corresponding to said black-representative amplitude connected to said grid and lying in said operating range, means connected to apply said video signal to said grid with a total amplitude range falling within said operating range and with said black-representative amplitude coinciding with said fixed potential, a second amplifier tube having a control grid and an output electrode and having a limited operating range and a cut-off point, a source of fixed potential connected to said last-named grid corresponding to black and lying in said last-named operating range, means connected to apply said video signal to said last-named grid with a total amplitude range greater than said last-named operating range and with said black-representative amplitude coinciding with said last-named fixed potential so that said white-representative amplitude falls beyond said cut-off point, and an output circuit including a common output impedance connected to said output electrodes.

2. An amplifier for controlling the gradation of a television video signal having a black-representative amplitude and a white-representative amplitude, comprising a first amplifier tube having a control electrode and an output electrode and having an operating range larger than the amplitude range of said signal, means connecting said signal to said control electrode, an output resistor connected to said output electrode, a stationary tap and a variable tap positioned on said resistor, a second amplifier tube having a control grid and an output electrode and having an operating range, a source of fixed potential corresponding to black connected to said last-named control grid and lying in said last-named operating range, a signal coupling means connected between said stationary tap and said last-named control grid, said last-named operating range being at least as large as the amplitude range of the signals coupled to said last-named control grid, a third amplifier tube having a control grid and an output electrode and having an operating range and a cut-off point, a source of fixed potential corresponding to black connected to said last-named control grid and lying in the last-named operating range, a signal coupling means connected between said variable tap and said last-named control grid, said variable tap being adjusted to apply to said last-named control grid a video signal having an amplitude range greater than said last-named operating range so that said white-representative amplitude falls beyond said cut-off point, and a common output resistor connected to the output electrodes of said second and third tubes.

3. An amplifier for controlling the gradation of a television video signal having a black-representative amplitude and a white-representative amplitude, comprising a first amplifier tube having a control electrode and an output electrode and having an operating range larger than the amplitude range of said signal, means connecting said signal to said control electrode, an output resistor connected to said output electrode, a stationary tap and a variable tap positioned on said resistor, a second amplifier tube having a control grid and an output electrode and having an operating range, a source of fixed potential corresponding to black connected to said last-named control grid and lying in said last-named operating range, a signal coupling means connected between said stationary tap and said last-named control grid, said last-named operating range being at least as large as the amplitude range of the signals coupled to said last-named control grid, a third amplifier tube having a control grid and an output electrode and having an operating range and a cut-off point, a source of fixed potential corresponding to black connected to said last-named control grid and lying in the last-named operating range, a signal coupling means connected between said variable tap and said last-named control grid, said variable tap being adjusted to apply to said last-named control grid a video signal having an amplitude range greater than said last-named operating range so that said white-representative amplitude falls beyond said cut-off point, an output resistor connected to the output electrode of said second tube, and a tap positioned on said last-named resistor and connected to the output electrode of said third tube.

4. An amplifier for controlling the gradation of a television video signal having a black-representative amplitude and a white-representative amplitude, comprising a first amplifier tube having a control electrode and an output electrode and having an operating range larger than the amplitude range of said signal, means connecting said signal to said control electrode, an output resistor connected to said output electrode, a stationary tap and a variable tap positioned on said resistor, a second amplifier tube having a control grid and an output electrode and having an operating range, a source of fixed potential corresponding to black connected to said last-named control grid and lying in said last-named operating range, a signal coupling means connected between said stationary tap and said last-named control grid, said last-named operating range being at least as large as the amplitude range of the signals coupled to said last-named control grid, a third amplifier tube having a control grid and an output electrode and having an operating range and a cut-off point, a source of fixed potential corresponding to black connected to said last-named control grid and lying in the last-named operating range, a signal coupling means connected between said variable tap and said last-named control grid, said variable tap being adjusted to apply to said last-named control grid a video signal having an amplitude range greater than said last-named operating range so that said white-representative amplitude falls beyond said cut-off point, a first output resistor connected to the output electrode of said second tube, and a second output resistor connected between the output electrodes of said second and third tubes.

5. An amplifier comprising a source of television video signals, said signals having a black level amplitude and a white level amplitude, two amplifier stages having a common output circuit including a common output impedance and each having a signal input electrode and a given operating range with respect to signal amplitude, each said operating range being bounded on one side by a cut-off region, sources of fixed potential corresponding to said black level amplitude connected respectively to said input electrodes, means coupling said video signals to a first one of said amplifier stages with an amplitude range falling entirely within the operating range of said first stage and with said black level amplitude coinciding with said fixed potential applied to the input electrode of said first stage, and means coupling said video signals to the second one of said amplifier stages with said black level amplitude coinciding with said fixed potential applied to the input electrode of said second stage whereby the black level falls within the operating range of said second stage, said last-named coupling means being adapted to apply said video signals to said second stage with an amplitude range sufficiently great so that the white level falls in the cut-off region of said second stage.

References Cited in the file of this patent

UNITED STATES PATENTS

| | | |
|---|---|---|
| 1,550,684 | Espenschied | Aug. 25, 1925 |
| 2,074,047 | Dechant | Mar. 16, 1937 |
| 2,252,613 | Bingley | Aug. 12, 1941 |
| 2,378,999 | Gillespie | June 26, 1945 |
| 2,577,506 | Belleville | Dec. 4, 1951 |
| 2,646,469 | Long | July 21, 1953 |
| 2,646,472 | Rockwell | July 21, 1953 |